July 4, 1967  H. G. HENCKEN  3,329,554
FABRIC BEARING MATERIAL
Filed July 24, 1962
FIG. I
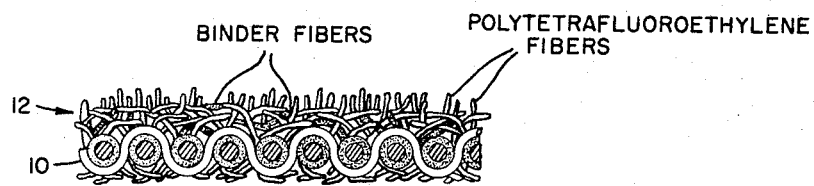
FIG. 2
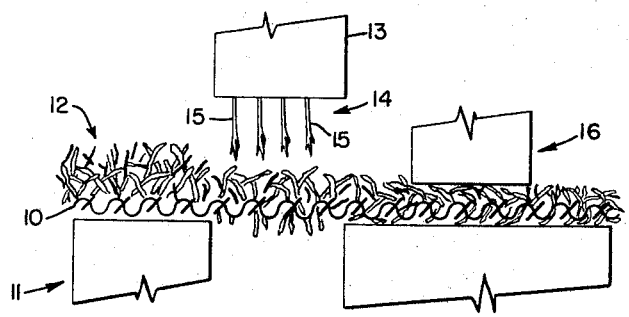
INVENTOR
HAROLD G. HENCKEN United States Patent Office 3,329,554
Patented July 4, 1967

3,329,554
FABRIC BEARING MATERIAL
Harold G. Hencken, Pecksland Road,
Greenwich, Conn. 06830
Filed July 24, 1962, Ser. No. 211,973
2 Claims. (Cl. 161—81)

This invention relates to fabric faced bearings having a self-lubricating surface and particularly to polytetrafluoroethylene fiber-faced bearing fabric, and to a method of making the same.

It is old in the art to provide self-lubricating bearing surfacing media including polytetrafluoroethylene (sold by E. I. du Pont de Nemours and Company under the trademark "Teflon") resin fibers woven into cloth with or without a second fiber used as a diluent or reinforcing member. Tetrafluoroethylene often is referred to in the art as "TFE." It also is old to provide self-lubricating bearing surfacing media in which batts of non-woven fibers of polytetrafluoroethylene and other materials are needled together. Such woven fabrics and needled fiber batts have not proved completely satisfactory due at least in part to the fact that woven fabrics prevent the maximum exposure of the polytetrafluoroethylene fibers at the surface since the very nature of weaving precludes maximum exposure, particularly if the woven fabric includes reinforcing threads of material other than polytetrafluoroethylene. Since the polytetrafluoroethylene fibers possess inherent self-lubricating or low frictional characteristics, which can be termed "lubricity," it is essential that a maximum exposure of such fibers be effected without presence of undesirable materials. The needled batts of polytetrafluoroethylene alone or in conjunction with other fibers do not provide a sufficiently durable bearing medium.

One of the objects of the invention is to provide a low coefficient of friction bearing media that requires no additional lubricant.

Still another of the objects of the invention is to provide a polytetrafluoroethylene fiber-faced bearing surface fabric means and methods of making the same in which maximum exposure of the polytetrafluoroethylene on one face thereof is effected, and in which a strong, durable fabric and surface is produced.

Another object of the invention is to provide such a bearing surface fabric means and method of making the same in which the polytetrafluoroethylene fibers are mechanically attached to a base fabric without weaving and wherein a maximum of exposure of polytetrafluoroethylene fibers is obtained, the fabric means being formable into shaped bearing surfaces.

In one aspect of the invention, a sheet of woven fabric, such as cotton duck, also referred to as "canvas," may be covered with a batt of a mixture of polytetrafluoroethylene fibers and other fibers having a lower softening or melting point than the polytetrafluoroethylene fibers and possessing adhesive or cohesive properties when subjected to heat, pressure or chemical action. The duck and batts are subjected to a needling process which comprises the passing of many needles from above the batt downwardly through the duck or vice versa. The needles have barbs on the shanks for forcing many of the polytetrafluoroethylene and other fibers through the batts and duck on the forward stroke, releasing the fibers on the return stroke, thereby mechanically interlocking polytetrafluoroethylene and other fibers to the duck or woven backing material.

With such a needled mixture of polytetrafluoroethylene and, for example, polypropylene fibers, the application of sufficient heat and pressure thereto will cause the polypropylene fibers to soften or fuse and also become adhesive or cohesive, the polypropylene fibers retracting away from the bearing surface and wicking into the woven fabric. It has been found that the heated polypropylene fibers retract from the bearing surface and penetrate into the duck or base material, leaving primarily the polytetrafluoroethylene fibers sticking up away from the duck or base fabric, the polypropylene fibers heat sealing or locking the polytetrafluoroethylene fibers to the base fabric.

The invention may be used for various purposes where a bearing surface is required such as drawer slides, socket joints and universal joints.

Other objects, advantages and features of the invention will become apparent from the following specifications and accompanying drawing which are merely exemplary.

In the drawing:

FIG. 1 is an enlarged sectional view of a portion of fabric to which the principles of the invention have been applied; and FIG. 2 is a schematic diagram of the steps of the method of making the article of FIG. 1.

Referring to FIG. 2, a layer of duck or other relatively strong woven fabric material 10 may be supported on a needle loom 11 and may be covered with a carded batt 12 of polytetrafluoroethylene fibers admixed with a percentage of binder fibers such as polypropylene fibers. The fibers may be in the order of about 5 denier, such as 6.7 denier for the polytetrafluoroethylene, and the percentages of the polytetrafluoroethylene fibers and polypropylene fibers may vary substantially. The binder fiber, such as polypropylene, may have a denier of 1.5 to 12.0 or even larger.

Excellent results were obtained with an admixture of about 70% polytetrafluoroethylene fibers and about 30% polypropylene fibers. The woven base material and batts are subjected to a needling process which comprises passing the duck and batt through the needle loom. The needles 14 include barbs 15 on their shanks, which when the beam 13 moves downwardly forcing the needles 14 through the batt 12 and duck 10, causes many of the polytetrafluoroethylene and polypropylene fibers to be forced or pushed into the duck 10. Upon the return or upward stroke of beam 13, these fibers are released, providing a mechanical interlock between the batt 12 and duck 10. The duck 10 and batt 12 of the admixed fibers which have been subjected to the needling process may be subjected to at least a preliminary heating and pressing action at a station or zone 16. As the polypropylene fibers are heated, they form an adhesive or cohesive mass that retracts from the polytetrafluoroethylene fibers and wicks or penetrates into the interstices of the duck base and which when cooled, solidifies, locking the polytetrafluoroethylene fibers to the duck with the latter protruding upwardly from the one face of the base material.

As an example, a 10-ounce duck was used and a batt laid thereon containing 4 ounces per square yard of a blend of 70% polytetrafluoroethylene fibers and 30% polypropylene fibers, the fibers being about 5 denier. The batt and duck were passed through a needle loom and then heat pressed at about 300° F. with a pressure of about 20 p.s.i. It has been found that with the use of 3 ounces per square yard of polytetrafluoroethylene fiber, such will provide the necessary polytetrafluoroethylene coverage on the duck. There may be 20–40% of polypropylene fiber used. The binder fiber must be one which will retract from the polytetrafluoroethylene and wick into the base fabric and in turn bind the polytetrafluoroethylene to the base fabric and leave the polytetrafluoroethylene fibers substantially vertically oriented relative to the surface of the base fabric. Polypropylene is the preferred fiber for this purpose because it has a sufficiently high melting point to withstand usual bearing surface applications. Among other binder fibers which may be used, however, are polyvinyl chloride, polyethylene, polyvinylidene chloride and plasticized acetate.

Although the various features of the fabric having a self-lubricating surface have been shown and described in detail to fully disclose several embodiments of the invention, it is evident that changes may be made in such details and certain features may be used without others without departing from the principles of the invention except as defined in the appended claims.

What is claimed is:

1. The method of making a fabric for a bearing having at least one surface with a low frictional character which comprises applying a carded batt of polytetrafluoroethylene and binder fibers selected from the group consisting of polypropylene, polyvinyl chloride, polyethylene, polyvinylidene chloride, and plasticized acetate to one side of a woven fabric base; passing a plurality of barbed needles through said batt and base in a manner to cause a plurality of the batt fibers to pass transversely through said base; and applying about 300 degrees Fahrenheit heat and pressure of about 20 pounds per square inch to said base and batt to cause softening of said binder fibers, whereby the binder fibers lock said polytetrafluoroethylene fibers to said base, said binder fibers coalescing with said base fabric so that said polytetrafluoroethylene fibers are primarily exposed on one surface of said base.

2. A fabric material for a bearing comprising in combination, a layer of base woven fabric material; and a carded batt on at least one surface of said base material, said batt comprising a mixture of about 60 to 80 percent of polytetrafluoroethylene fibers with at least 3 ounces per square yard thereof and 20 to 40 percent of retractable polypropylene fibers, said batt having a plurality of fibers projecting transversely through the carded batt and the woven fibers layer, said fibers being randomly disposed relative to the flat surface of said batt, and said polytetrafluoroethylene fibers being bonded to said base material, said polypropylene fibers being coalesced to the base material and also being in retracted position so as to leave primarily the polytetrafluoroethylene fibers exposed thereon.

References Cited
UNITED STATES PATENTS

| | | | |
|---|---|---|---|
| 2,331,321 | 10/1943 | Heaton | 156—148 |
| 2,437,689 | 3/1948 | Francis | 156—148 |
| 2,773,781 | 12/1956 | Rodman | 117—138.8 |
| 2,804,886 | 9/1957 | White | 139—420 |
| 2,840,881 | 7/1958 | Bateman | 161—154 |
| 2,893,105 | 7/1959 | Lauterbach | 161—154 |

EARL M. BERGERT, *Primary Examiner.*

L. T. PIRKEY, W. HOAG, *Assistant Examiners.*